United States Patent [19]
Nakashio et al.

[11] 3,888,809
[45] June 10, 1975

[54] PAINT CONTAINING PULLULAN

[75] Inventors: Seizo Nakashio, Nishinomiya; Noriyuki Sekine, Osaka; Nobuhiro Toyota, Osaka; Fumio Fujita, Osaka, all of Japan

[73] Assignees: Sumitomo Chemical Co., Ltd., Osaka; Hayashibara Biochemical Laboratories, Inc., Okayama, both of Japan

[22] Filed: Sept. 24, 1974

[21] Appl. No.: 508,844

[30] Foreign Application Priority Data
Sept. 29, 1973  Japan................ 48-10994

[52] U.S. Cl........... 260/17.4 ST; 106/162; 106/213; 106/311; 260/9; 260/17.2; 260/17.3
[51] Int. Cl............................................. C08d 9/06
[58] Field of Search ............ 260/9, 17.2, 17.3, 17.4; 106/162, 311, 213; 195/31 P

[56] References Cited
UNITED STATES PATENTS

| | | | |
|---|---|---|---|
| 3,447,940 | 6/1969 | Halleck | 106/162 |
| 3,784,390 | 1/1974 | Hijiya et al. | 106/139 |
| 3,827,937 | 8/1974 | Kato et al. | 195/31 P |

Primary Examiner—Morris Liebman
Assistant Examiner—Edward Woodberry
Attorney, Agent, or Firm—Stevens, Davis, Miller & Mosher

[57] ABSTRACT

A paint containing as a main or subsidiary component a pullulan, which is a linear high polymer having repetition units, bonded through α-1,6-linkages, of maltotriose, a trimer of glucose, and has a molecular structure represented by the formula,

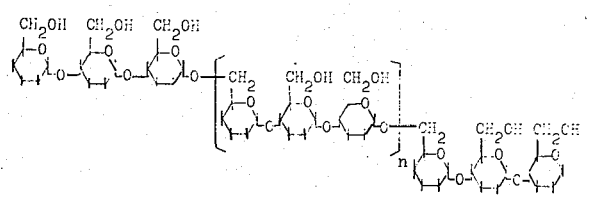

wherein $n$ represents the polymerization degree, and is an integer of 20 to 10,000, can form a film excellent in film characteristics.

6 Claims, No Drawings

PAINT CONTAINING PULLULAN

This invention relates to a novel paint capable of forming a film excellent in film characteristics. More particularly, the invention pertains to a novel paint containing pullulan.

Paints which have heretofore been available include oil paints, lacquers, spirit varnishes, aqueous paints, electrical insulation paints, synthetic resin paints, thinners and other miscellaneous paints.

When classified as vehicles, the paints include alkyd resins, aminoalkyd resins, acryl resins, vinyl chloride resins, epoxy resins, polyurethane resins, unsaturated polyester resins, phenolic resins, melamine resins, styrene-butadiene copolymer resins, polyvinyl acetate resins, vinyl acetate-acrylic ester copolymer resins, styrene-acrylic ester or acrylonitrile copolymer resins, vinylidene fluoride resins, and many other materials. When viewed from their forms, the paints may be classified into liquid type, nonaqueous solution type, aqueous solution type, emulsion type and dust type. As procedures for coating the above-mentioned paints, there are adopted, in addition to those employed hitherto, such novel procedures as roller coating, electrodeposition coating, dust coating, and ultraviolet or radiation polymerization coating.

Among the above-mentioned paints, the aqueous paints have come to be of particular importance in view of improvement in working environment and prevention of working environment from danger of fire, coupled with progress of coating procedures.

When viewed from the kind of vehicles used, the aqueous paints may be roughly divided into two; emulsion paints in which water-insoluble resins have been dispersed to the form of fine particles, and water-soluble paints in which water-soluble resins have been used as vehicles. Further, when viewed from the drying conditions, the aqueous paints may be roughly divided into normal temperature drying paints capable of drying on standing at normal temperature, and bake-drying type paints capable of forming complete films on heating.

Generally, water-soluble high molecular substances such as starch, dextrin, gum arabic, glue, sodium alginate, carboxymethyl cellulose, polyvinyl alcohol, casein have been used as normal temperature drying type aqueous paints. These paints, however, have no excellent film-forming ability and hence have merely been used as water-soluble binders, e.g. sealers or undercoaters at the time of wood-coating.

Further, phenol-formaldehyde, melamineformaldehyde, aminoalkyd and the like resins have been used as bake-drying type aqueous paints. In consideration of the safety of working environment, however, these paints have been desired to be improved so as to solve the probelms derived from the toxicity and odor of formalin or amine.

On the other hand, emulsion paints, particularly emulsion paints of synthetic resin obtained by emulsion polymerization, are safely usable and excellent in processability and film-properties. Because of these advantages, the emulsion paints have come to be increased in amount of consumption. However, the emulsion paints have such disadvantages that films formed therefrom are not completely continuous films and are inferior in gloss. Further, the emulsions themselves are not sufficient in storability and coatability, and hence are required to be used in combination with various water-soluble high molecular substances such as, for example, carboxymethyl cellulose, methyl cellulose, hydroxyethyl cellulose, sodium alginate, casein, polyacrylates or polyvinyl alcohols.

An object of the present invention is to provide a paint containing pullulan as a constituent.

Another object of the invention is to provide a paint containing a novel coating material, which is different in molecular structure from a conventional coating material, and which is high in brushability and film-forming ability and forms a film excellent in color retainability and gloss.

Other objects and advantages of the invention will become apparent from the explanation given below.

The pullulan used in the present invention is a linear high polymer having repetition units, bonded through α-1,6-linkages, of maltotriose, which is a trimer of glucose, and has a molecular structure represented by the formula,

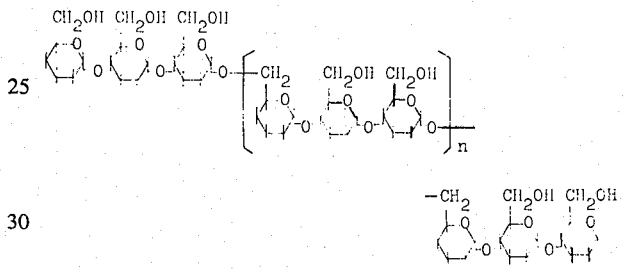

wherein $n$ represents the polymerization degree, and is an integer of 20 to 10,000.

The pullulan has been known as a water-soluble tacky substance, and is a novel substance which is entirely unknown in the field of paints.

As the result of studies, the present inventors found that the pullulan has excellent properties as a paint. Based on this finding, the inventors have accomplished the present invention.

Although it contains glucose units in the molecule, the pullulan used in the present invention is entirely different in molecular structure and properties from starch, dextrin, gum arabic, carboxymethyl cellulose, methyl cellulose, sodium alginate and the like polysaccharides or derivatives thereof which also are glucose derivatives having glucose units and have heretofore been used as paints. This point is connected to the excellent properties of pullulan as a paint. The pullulan is extremely high in film-forming ability and can give a film excellent in strength, elasticity, hardness and gloss, and thus is entirely different from the above-mentioned polysaccharides or derivatives thereof which have no functionally excellent film-forming ability. The pullulan has great features in film-forming ability and film characteristics which are fundamental properties of paints. Further, the pullulan can make a solution which is stable over a long period of time and brings about no gelation nor so-called "aging" phenomenon, unlike in the case of starches. A film formed from the pullulan is extremely high in transparency and is excellent in adhering property, heat resistance and weather resistance. Further, the pullulan film shows markedly low oxygen permeability coefficient, and hence is effective to coat or protect a pigment or adjunct susceptible to oxidation, or a substrate susceptible to oxidative degradation. In addition, the paint containing pullulan is favorable in brushability, which is an important property for a paint.

Because of such characteristic properties as mentioned above, the pullulan is excellent as a vehicle for use in an aqueous paint. Even when used as a film-forming subsidiary element in a synthetic resin emulsion paint, however, the pullulan is more excellent than carboxymethyl cellulose, methyl cellulose, hydroxyethyl cellulose or polyvinyl alcohol, since it is not only higher in film-forming ability and brushability but also can form a film more favorable in properties and appearance. Accordingly, the pullulan can be used in admixture with a synthetic resin emulsion paint. As such synthetic resin emulsion, there may be shown polyvinylacetate emulsion and polyethylacrylate emulsion.

The paint of the present invention is not particularly limited in kind of substance to which it is to be applied. Further, the present paint may be incorporated with any pigments or additives used in a conventional paint.

While the characteristic features of the pullulan have been explained above with reference to the case of aqueous paints, the pullulan is usable also as such reactive reagent or additive as a polyol component used in, for example, alkyd, polyurethane, polyester, phenolic, melamine or acryl resins. In this case, such characteristics of the pullulan as being non-toxic and odorless result in great advantages in connection with the recent demand for paints higher in working safety.

In using the pullulan according to the present invention, the utility thereof as a paint is more enhanced when water resistance is imparted thereto. For this purpose, any known method to insolubilize other polymers having active hydrogen or hydroxyl groups may be utilized, in addition to using as the polyol as mentioned above.

The pullulan used in the present invention is not particularly limited in process for production thereof, and may be obtained by any of chemical or biochemical synthesis process (e.g. U.S. Pat. No. 3,827,937). At present, however, it can be obtained as a tacky substance secreted in a culture liquor of a strain belonging to the genus pullularia which is an incomplete microorganism [H. Bender, J. Lehmann et al.: Biochem. Biophys. Acta, 36, 309 (1959); Seinosuke Ueda: Kogyo Kagaku Zasshi (Journal of Industrial Chemistry), 67, 757 (1964)]. That is, a strain pullularia pullulans is subjected to shaking culture at 24°C for 5 days in a medium containing 10% of partially hydrolyzed starch, 0.5% of $K_2HPO_4$, 0.1% of NaCl, 0.02% of $MgSO_4 \cdot 7H_2O$, 0.06% of $(NH_4)_2SO_4$ and 0.04% of yeast extract, whereby pullulan is obtained as a tacky substance secreted from the cells into the culture liquor. If necessary, the culture liquor is freed from the cells by centrifugation, and the supernatant is charged with methanol to deposit a pullulan precipitate, which is then repeatedly subjected to water dissolution and methanol precipitation, followed by drying, whereby purified pullulan is obtained in a yield of 60 to 70% based on the saccharide. The thus obtained pullulan somewhat varies in physical properties depending on the kind of strain used, but pullulan obtained from any strain may be used in the present invention.

The molecular weight of the pullulan used in the present invention is not particularly limited, but is preferably from 10,000 to 5,000,000, more preferably 50,000 to 1,000,000.

The paint of the present invention is not particularly restricted in form and application manner, and may be used like in the case of the conventional paints.

Characteristics of pullulan as a paint are illustrated below with reference to Examples, but the present invention is not limited to the Examples.

EXAMPLE 1

On a glass plate, a film was cast from a 3% aqueous solution of each of pullulan (molecular weight 150,000) and polyvinyl alcohol (Gosenol GH-23, Manufactured by Nihon Gosei Kagaku Co. Ltd.), and dried at 70°C for 18 hours to prepare a film of 50 microns in thickness. The film was allowed to stand at 23°C and a relative humidity of 77% for 24 hours, and then measured in physical properties to obtain such results as shown in Table 1.

Under the same conditions as above, no film having such strength as to withstand the physical property measurement could be obtained from each of starch and sodium alginate.

Table 1

|  | Pullulan | Polyvinyl alcohol |
|---|---|---|
| Tensile strength ($kg/cm^2$) | 400 | 350 |
| Young's modulus ($kg/cm^2$) | 14,100 | 1,700 |
| Pencil hardness | 2B | 6B |

Notes: Tensile strength and Young's modulus were measured according to ASTM D-887-67 by means of Autograph" Type 1M-100 of Shimazu Seisakusho Co., Ltd.

Pencil hardness was measured according to JIS K-5400 by using a pencil hardness tester, Yasuda Seiki Co., Ltd.

EXAMPLE 2

The films prepared in Example 1 were individually measured in weather resistance at 40°C and a relative humidity of 40% using a xenon fade tester. The results obtained were as set forth in Table 2.

Table 2

| Period (Days) | 0 | | 30 | | 60 | | 90 | |
|---|---|---|---|---|---|---|---|---|
| Physical properties | Pullulan | PVA | Pullulan | PVA | Pullulan | PVA | Pullulan | PVA |
| Tensile strength ($kg/cm^2$) | 400 | 350 | 450 | 380 | 460 | 400 | 460 | 400 |
| Ultimate elongation (%) | 30 | 300 | 20 | 250 | 20 | 200 | 20 | 150 |

Note: Ultimate elongation: (PVA: Polyvinyl alcohol) Measured by Autograph" IM-100

EXAMPLE 3

100 Parts of a white paint (produced by Kansai Paint Co.) comprising a polyvinyl acetate type latex was incorporated with 2.5 parts of pullulan (molecular weight 70,000), and then stirred at normal temperature to dissolve the pullulan therein.

The thus treated paint was brush-coated once on a wood plate, whereby the paint could be uniformly coated to a length of 19 cm.

For comparison, the paint containing no pullulan was coated in the same manner as above, whereby the paint could not be coated but to a length of 12 cm.

What is claimed is:

1. A paint containing pullulan.
2. A paint according to claim 1, wherein the molecular weight of said pullulan is 10,000 to 5,000,000.
3. A paint according to claim 1 which is an aqueous paint.
4. A paint according to claim 1 which contains only pullulan as a vehicle.
5. A paint according to claim 1 which contains pullulan and a synthetic resin as vehicles.
6. A paint according to claim 5, wherein the synthetic resin is alkyd resins, amino-alkyd resins, acryl resins, vinyl chloride resins, epoxy resins, polyurethane resins, unsaturated polyester resins, phenolic resins, melamine resins, styrene-butadiene copolymer resins, polyvinyl acetate resins, vinyl acetate-acrylic ester copolymer resins, styrene-acrylic ester or acrylonitrile copolymer resins or vinylidene fluoride resins.

* * * * *

UNITED STATES PATENT OFFICE
CERTIFICATE OF CORRECTION

PATENT NO. : 3,888,809
DATED : June 10, 1975
INVENTOR(S) : Seizo NAKASHIO et al.

It is certified that error appears in the above-identified patent and that said Letters Patent are hereby corrected as shown below:

Foreign Application Priority Data

Sept. 29, 1973  Japan .................. 48-109944

Signed and Sealed this thirtieth Day of September 1975

[SEAL]

Attest:

RUTH C. MASON
Attesting Officer

C. MARSHALL DANN
Commissioner of Patents and Trademarks